US006831819B2

(12) United States Patent
Nemir et al.

(10) Patent No.: US 6,831,819 B2
(45) Date of Patent: *Dec. 14, 2004

(54) FAIL SAFE FAULT INTERRUPTER USING SECONDARY BREAKER

(76) Inventors: David C. Nemir, 1221 Baltimore, El Paso, TX (US) 79902; Stanley Hirsh, 825 Cloudburst Dr., El Paso, TX (US) 79912; Edward Rubio, 8106 Tigua Cir., El Paso, TX (US) 79907

( * ) Notice: Subject to any disclaimer, the term of this patent is extended or adjusted under 35 U.S.C. 154(b) by 91 days.

This patent is subject to a terminal disclaimer.

(21) Appl. No.: 10/237,319

(22) Filed: Sep. 8, 2002

(65) Prior Publication Data

US 2003/0063419 A1 Apr. 3, 2003

Related U.S. Application Data

(60) Provisional application No. 60/322,368, filed on Sep. 9, 2001.

(51) Int. Cl.$^7$ ................................................. H02H 3/00
(52) U.S. Cl. ........................................ 361/42; 324/424
(58) Field of Search ................... 361/42–50; 324/423, 324/424, 418, 522, 523, 527–529

(56) References Cited

U.S. PATENT DOCUMENTS

| 3,403,238 | A  | 9/1968  | Buehler et al. |
| 3,629,766 | A  | 12/1971 | Gould          |
| 4,473,859 | A  | 9/1984  | Stone et al.   |
| 4,829,390 | A  | 5/1989  | Simon          |
| 5,394,289 | A  | 2/1995  | Yao et al.     |
| 6,262,871 | B1 | 7/2001  | Nemir et al.   |
| 6,282,070 | B1 | 8/2001  | Ziegler et al. |
| 6,288,882 | B1 | 9/2001  | DiSalvo et al. |
| 6,381,112 | B1 | 4/2002  | DiSalvo        |

OTHER PUBLICATIONS

National Electrical Manufacturers Association, GFCI Field Test Survey Report, Jan. 2001.

*Primary Examiner*—Ronald Leja
(74) *Attorney, Agent, or Firm*—Jeffrey D. Myers; Peacock Myers & Adams, P.C.

(57) ABSTRACT

An apparatus and method for providing redundant protection to a fault detection/interruption circuit, thereby ensuring safe operation even in the case of a failure of the primary fault detection/interruption means. Upon the occurrence of a failure in the primary circuit interruption means, a secondary circuit breaker, or in some embodiments, a redundant primary circuit breaker release mechanism, serves to remove power from a protected outlet or output conductors.

16 Claims, 5 Drawing Sheets

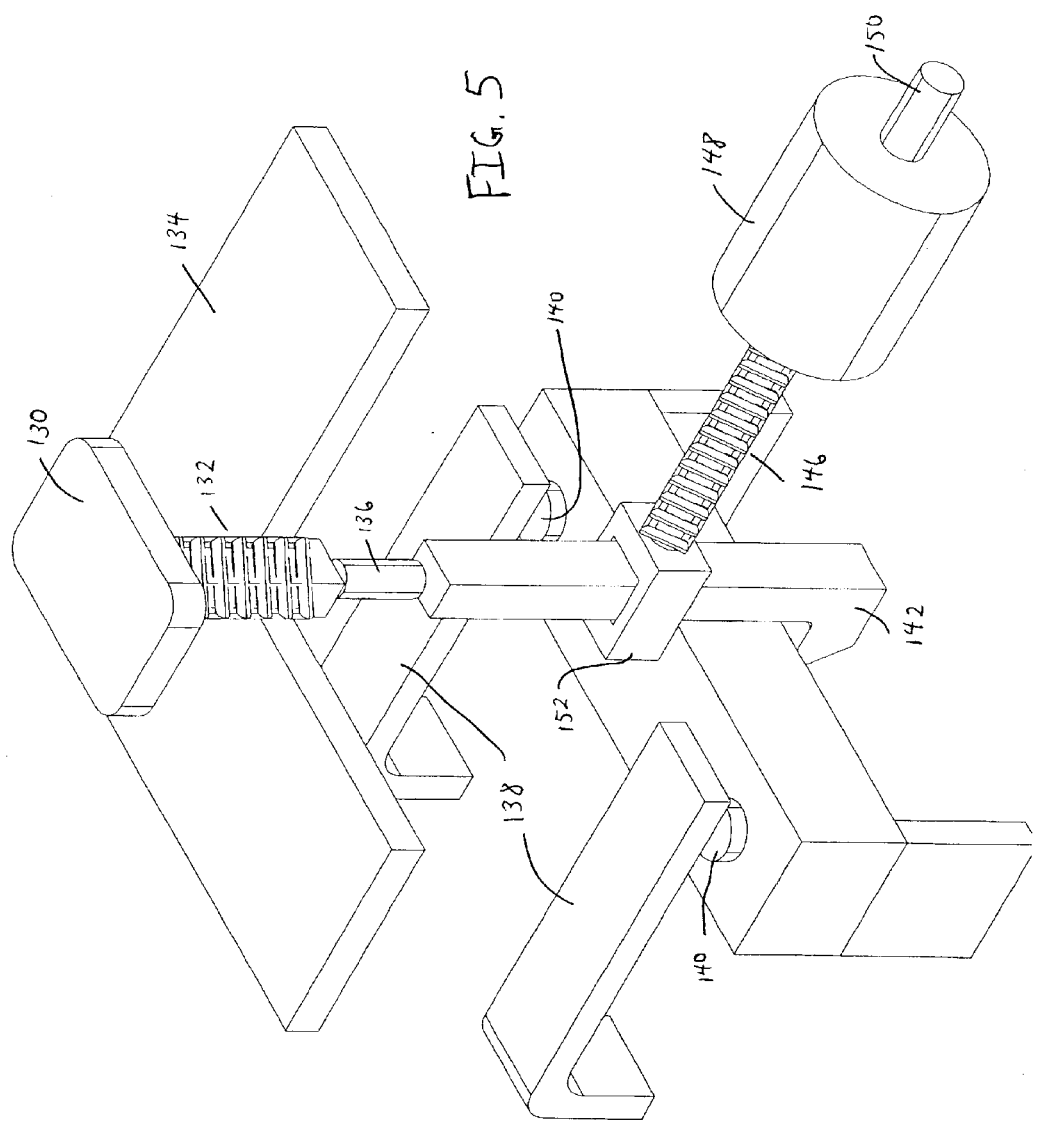

FAIL SAFE FAULT INTERRUPTER USING SECONDARY BREAKER

CROSS-REFERENCE TO RELATED APPLICATIONS

This application claims the benefit of the filing of U.S. Provisional Patent Application Ser. No. 60/322,368, entitled "Fail Safe Interrupter Using Secondary Breaker", filed on Sep. 9, 2001, and the specification thereof is incorporated herein by reference.

BACKGROUND OF THE INVENTION

1. Field of the Invention

This invention relates to an apparatus and method for providing redundant protection to a fault detection/interruption circuit, thereby ensuring safe operation even in the case of a failure of the primary fault detection/interruption means. Upon the occurrence of a failure in the primary circuit interruption means, a secondary circuit breaker, or in some embodiments, a redundant primary circuit breaker release mechanism, serves to remove power from a protected outlet or output conductors.

2. Background of the Invention

A common source of electrical injuries occurs when an accidental electrical leakage from one electrified object to a second object having a substantially different voltage potential occurs, with the electrical leakage passing through a human. When one of the two electrified objects is at the same potential as the earth (or so-called ground), this is called a ground fault. A circuit to protect against injury due to ground faults is called a ground fault circuit interrupter or GFCI. These devices are built into the electrical outlets of many homes and businesses and, in particular, are required by code in the U.S. for bathrooms and outdoor outlets in new construction.

GFCI's are not immune from failure. In the U.S., the 2001 GFCI Field Test Survey Report by the National Electrical Manufacturers Association found that an estimated 14% of circuit breaker GFCI's and 8% of receptacle GFCI's in the field are not operational. As the installed base of GFCI circuits ages, this percentage will increase. The finding of such a large percentage of non operational GFCI's has led to a great deal of concern about unprotected power. Clearly, any circuit improvements that can enhance the robustness of GFCI devices will serve to reduce the potential for electrical injury.

The present invention combines a secondary circuit breaker with a standard fault interrupter. This standard fault interrupter can be a ground fault circuit interrupt (GFCI) or one of the derivative fault interrupters including, but not limited to, arc fault circuit interrupt (AFCI), immersion detection circuit interrupt (IDCI), leakage current detect and interrupt (LCDI) or appliance leakage circuit interrupt (ALCI). The secondary circuit breaker is triggered some interval after certain events such as a sensed fault or a manual test. This secondary circuit breaker receives its power from a point that should have no power if the fault detection and interrupt mechanism is correctly functioning. Consequently, if the fault detection/interruption circuit works satisfactorily, then the secondary circuit breaker is never fired. In its preferred embodiment, the secondary breaker would be a one-shot circuit breaker, serving to permanently remove power from the output and forcing the user to replace the malfunctioning unit. One shot circuit breakers are designed as normally closed switches, which, when activated, open permanently.

There are a variety of circuit interruption means that comprise the class of one-shot circuit breakers. The most common example is a thermal fuse, whereby two electrical conductors are in electrical contact through a low melting point linkage that opens when the current flow exceeds a certain threshold. U.S. Pat. No. 3,629,766 (Gould) describes a circuit breaker wherein a fusible wire link holds spring biased conductors in a closed position. When a predetermined electrical current is passed through the fusible link it causes it to break, effecting the snap action release of the spring arms and breaking the electrical connection. Other examples of circuit interruption means include the one-shot breaker described in U.S. Pat. No. 5,394,289 (Yao and Keung) wherein wire fuses connect two sets of two conductors. A current overload is used to break one fuse, whereupon, a cutting element is released to cut through the other fuse. U.S. Pat. No. 4,829,390 (Simon) describes a switch that is held in a normally closed position by a flash bulb. A sensor detects a dangerous condition and actuates the flash bulb, causing it to disintegrate and allowing the switch to open. Bimetallic thermal and thermal magnetic circuit breakers are well known in the art and are the basis for many resettable circuit breakers, although they can be used for one-shot operation. These work by employing a blade made of two metals having different thermal coefficients of expansion. When the blade is heated, it deforms, breaking a circuit. The magnetic breakers use heating to reduce the magnetic attraction of a magnet, thereby causing a spring loaded contact to release and open a circuit. Other designs for circuit breakers include piezoelectric actuators as in U.S. Pat. No. 4,473,859 (Stone et al) and shape memory alloy actuators as in U.S. Pat. No. 3,403,238 (Buehler and Goldstein).

U.S. Pat. No. 6,262,871 B1 (Nemir et al) discloses an electronic test circuit for the self-testing of fault detection devices. This self-test circuit enhances the safety of such devices by periodically and automatically testing the function of the fault detection portion of the device without the need for manual intervention. By using a secondary circuit breaker, power may be safely and automatically removed from a malfunctioning fault detection device. One problem with this device is that the self-test circuit has a complexity that is of a higher order than that of the original fault detection/interruption electronics, thereby adding to overall system complexity and cost.

U.S. Pat. Nos. 6,282,070 B1 (Ziegler et al), 6,288,882 B1 (DiSalvo et al), and 6,381,112 B1 (DiSalvo) all disclose a fault detection/interruption device having a so-called "reset lockout". With a reset lockout, the electrical connections between input and output conductors are said to be prevented from resetting if the circuit interruption mechanism is non-operational or if an open neutral condition exists. However, these inventions have no means for self-test during normal operation. For example, if the fault detection component fails at some time during use, this failure will go undetected until such time as a manual test is implemented. Since there is no way to ensure that a periodic manual test is implemented, this approach can result in unprotected power being furnished at the outlet or over the branch wiring that connects the reset lockout equipped GFCI to an electrical outlet. Furthermore, some failure modes, such as welded circuit breaker contacts, will be undetected and uncorrected by these inventions.

3. Objects and Advantages

The present invention is designed to be easily added to, or integrated within, an existing technology GFCI circuit and to operate independently of that circuit. The present invention serves as an auxiliary tester that causes the overall device to fail safe in the event of a failure in the GFCI. One major advantage to the proposed invention is that it is inexpensive and can be added to an existing ground fault circuit interrupter, thereby taking advantage of existing technology while improving robustness. A second advantage is that it can automatically detect a malfunctioning electrical current interruption means and can cure that event by firing a secondary circuit breaker, thereby removing power from the system. Alternatively, rather than employing a completely independent secondary circuit breaker, some embodiments may utilize a combined release mechanism on a single, primary circuit breaker, with fail safe protection provided by a redundant, independently controlled, auxiliary circuit breaker release.

SUMMARY OF THE INVENTION

The present invention is a fail safe fault interrupter that consists of a conventional GFCI with either a second circuit breaker and a second circuit breaker trigger, or an auxiliary circuit breaker release mechanism. When either (a) a fault is sensed; or (b) a manual test is engaged; the second circuit breaker is triggered with a time delayed signal that takes its power from the load side of the fault interrupter. Accordingly, if the power to a fault is satisfactorily interrupted within a designated time after the application of either a manual test or a sensed fault, then there will be no power available to trigger the second circuit breaker (alternatively, the auxiliary circuit breaker release mechanism) and this second circuit breaker will remain in a closed position. Alternatively, if the power is not removed within the designated time interval, the secondary breaker will be opened, thereby removing power from the system.

BRIEF DESCRIPTION OF THE DRAWINGS

FIG. 5—Primary circuit breaker with redundant release mechanisms

LIST OF REFERENCE NUMERALS

22—Source conductor
24—Source conductor
26—Differential transformer
28—Secondary from current sense transformer
30—Detection electronics
32—Hot side primary circuit breaker contact
33—Neutral side primary circuit breaker contact
34—Load
36—Solenoid
38—Ground fault
39—Ground
40—Ground fault
42—Thyristor
44—Conductor delivering power to detection electronics
46—Conductor delivering power to detection electronics
50—Test button
52—Test fault resistance
53—Test fault resistance
56—Test circuit
57—GFCI circuit
58—Source side conductor
60—Source side conductor
66—Secondary circuit breaker contacts
70—Fault sense signal coming out of detection electronics
72—Test button pressed signal
76—Hot conductor on load side of primary circuit breaker
80—Control for secondary breaker
82—Diode
83—Diode
84—Charging resistor
86—Charging resistor
88—Charge storage capacitor
90—Discharge resistor
92—Charging resistor
94—One shot resistor
96—One shot thyristor
97—Bilateral trigger diode to control secondary circuit breaker
100—Diode bridge
102—Current sense transformer
104—Current sense transformer
106—Neutral conductor
108—Power supply capacitor
109—Gate of thyristor
110—Primary circuitry breaker trigger thyristor
112—Primary circuit breaker solenoid
114—Primary circuit breaker contacts
116—Test capacitor
118—Zener diode
120—Charge resistor
122—Transistor
124—Diode
126—Secondary circuit breaker thyristor
128—Secondary circuit breaker
130—Reset button
132—Spring
134—Fixed plate
136—Fusible element
138—Leaf spring connectors
140—Electrical contacts
142—Arm
144—Moveable member
146—Spring
148—Solenoid
150—Plunger
152—Collar

DESCRIPTION OF THE PREFERRED EMBODIMENTS

Figure 1:
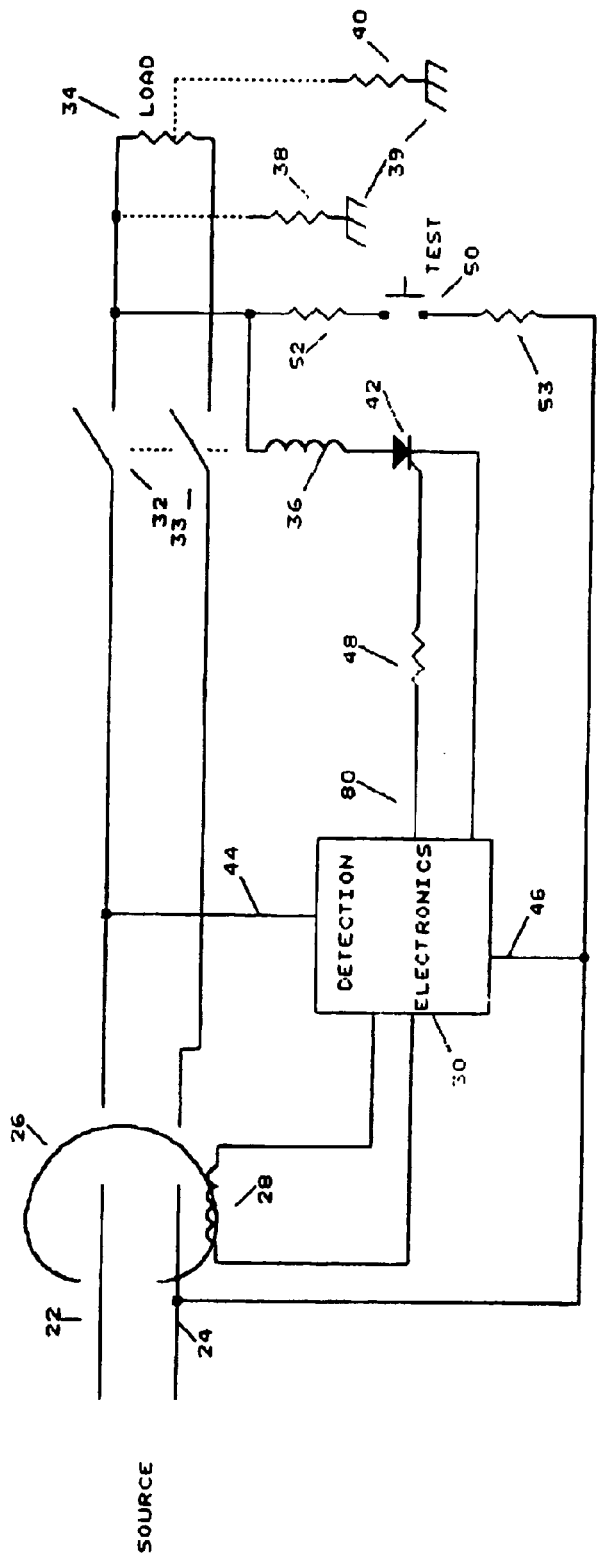
FIG. 1—Block diagram of prior art GFCI circuits

FIG. 1 gives a block diagram that functionally describes the majority of present day GFCI circuits. This is the prior art circuit that is the basis for almost any GFCI found in the home or in commercial or industrial construction. The incoming conductors from the source are conductors 22 and 24. In the U.S., one of these conductors (for this discussion, conductor 24) is generally required by code to be grounded at a distribution panel and is known as the "neutral" conductor. In such a system, the ungrounded current carrying conductor is often called the "hot" conductor. Conductors 22 and 24 pass through a differential current sense transformer 26, thereby acting as the primary for that transformer. The secondary 28 of the current sense transformer 26 connects to the detection electronics 30, which may filter and/or amplify and/or otherwise process the voltage from the secondary windings 28 of the current sense transformer 26. The detection electronics 30 derive power from conductors 44 and 46. In normal operation, electrical current is delivered to the load 34 through circuit breaker contacts 32 and 33. In some applications, such as in a load distribution panel, there is a single circuit breaker contact 32 for interrupting electrical current on the ungrounded conductor and there is no circuit breaker contact 33 (equivalently, circuit breaker contact 33 is always closed). For a system with two circuit breaker contacts 32 and 33, circuit breaker contacts 32 and 33 are closed during normal operation but are driven to be in an open position by solenoid 36 if a ground fault condition is sensed.

In FIG. 1, ground faults 38 and 40 are depicted with dashed lines to indicate that these are not always present. These represent fault events that a GFCI is designed to sense and to remedy by opening the relay contacts 32 and 33. Either of ground faults 38 or 40 could represent a human being that has come into electrical contact with a high potential conductor and with ground 39.

In normal operation, in the absence of a ground fault, the same amount of electrical current flows in conductors 22 and 24 but in opposite directions. The net magnetic flux in the differential current sense transformer 26 is then zero and the voltage that is generated in the transformer secondary 28 is zero. When circuit breaker contacts 32,33 are closed and a load side electrical leakage path 38 occurs from conductor 22 to ground 39 or an electrical leakage path 40 occurs from within the load 34 to ground 39 then there is a current imbalance between conductors 22 and 24. This results in a nonzero net magnetic flux being induced in the differential current sense transformer 26. This results in a nonzero voltage being induced in the secondary 28 of the transformer 26. The detection electronics 30 then takes this voltage and processes it to determine if a fault of sufficient magnitude and/or duration is taking place. If the detection electronics 30 determines that an objectionable fault is occurring, then it triggers a thyristor 42, which energizes a solenoid 36 which opens the circuit breaker contacts 32 and 33.

Test button 50 allows a manual test of the proper operation of the fault sensing/interrupting circuitry. When test button 50 is manually engaged, it causes a current flow through test resistors 52 and 53, resulting in an electrical leakage around the differential current sense transformer 26. This imbalance results in a voltage across the secondary 28 and is recognized as a fault by the detection electronics 30. The detection electronics 30 then energize thyristor 42, causing the circuit breaker contacts 32,33 to be opened. A user can thus manually test the GFCI by engaging the test button 50 and then listening for the relay contacts 32,33 to open or by observing a visual indication that the circuit breaker contacts 32,33 opened. This is the testing feedback that is built into most commercial GFCI circuits, however, an audible or visual indication can be misleading and the user can be left thinking that the GFCI is offering protection when it is not. For example, if one or both of the two circuit breaker contacts 32,33 is stuck in a permanently engaged position, then the GFCI may be unable to provide protection even though a "click" might be heard.

Although FIG. 1 is a representative embodiment of a GFCI, there are many possible permutations. For example, the detection electronics 30 in FIG. 1 may be simply a pass through connection to the gate of thyristor 42, in which case the secondary 28 of differential transformer 26 generates sufficient energy to trigger thyristor 42. Alternatively, the detection electronics 30 may consist of transistors and other components to amplify and/or filter the voltage developed on secondary 28. The solenoid 36 and/or the test button 50 may receive power from the load side of circuit breaker contact 32 as shown, or may be connected on the source side of circuit breaker contact 32. The solenoid 36 may be energized by a thyristor 42 as depicted, or may use a transistor or other type of switch. The solenoid 36 may be replaced by an alternative type of trip mechanism such as a bimetallic element or a fusible link.

Figure 2:
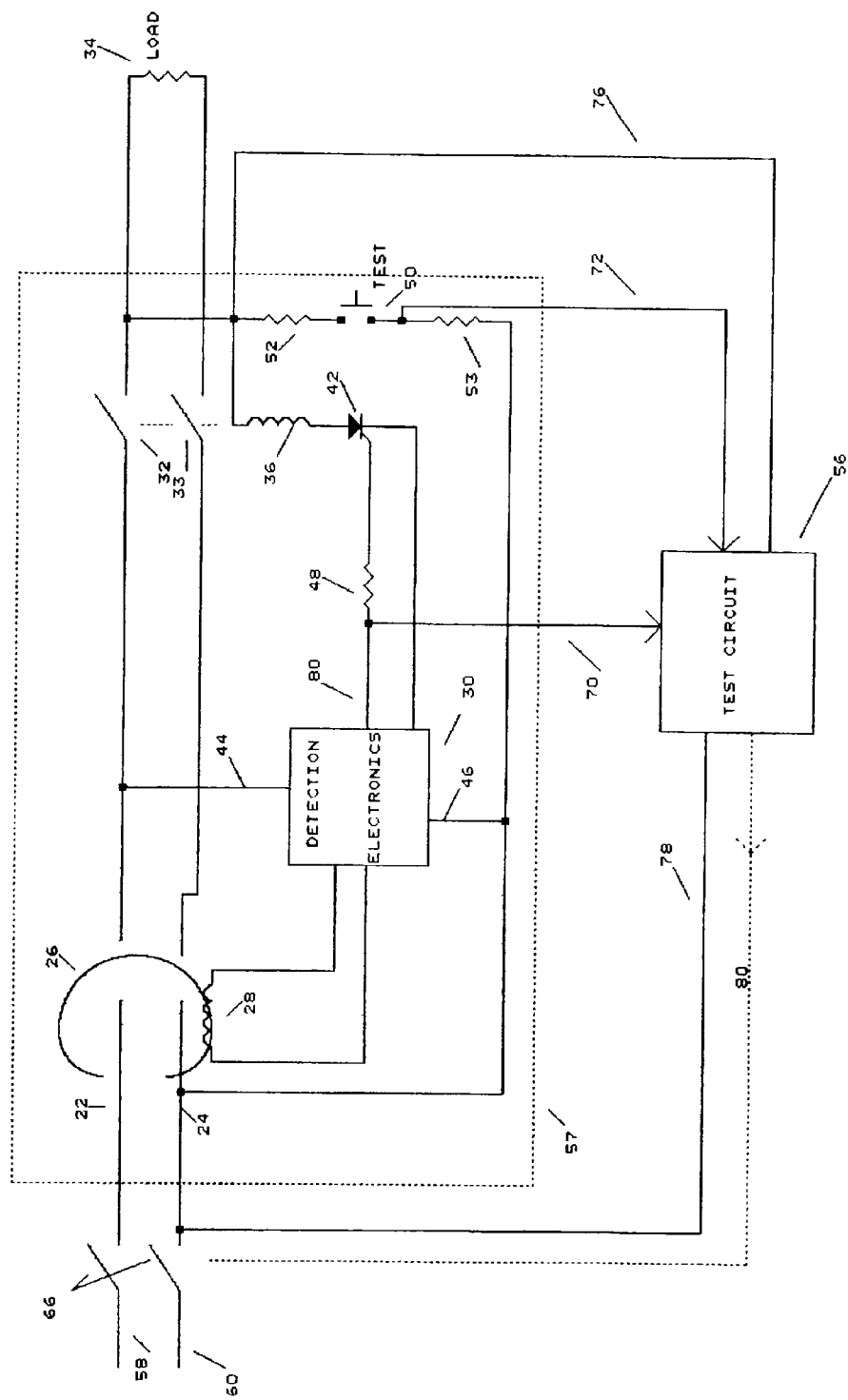
FIG. 2—Block diagram of GFCI with attached test circuit

FIG. 2 portrays a block diagram showing the present invention. The design builds upon the GFCI circuit of FIG. 1 which is inside the dashed box 57. Test circuit 56 monitors the fault detection signal 70 and the manual test signal 72. Test circuit 56 delays these signals for a specified time interval and then uses them to trigger a secondary circuit breaker using energy derived from line 76 which is connected to the load side of circuit breaker 32. Accordingly, if circuit breaker contact 32 opens within a time that is less than the test circuit delay, this represents a successfull functioning of the fault detection/interruption and no triggering of the secondary circuit breaker 66 will occur. A test circuit 56 takes signals 70 and 72 and combines these, delays their effect and then applies them to fire a secondary circuit breaker 66. Secondary circuit breaker 66 represents a separate, completely functional circuit breaker that has the ability to interrupt electrical current flow into the GFCI circuit and subsequent load. The secondary circuit breaker may be built as a so-called one shot circuit breaker. That is, it can be a nonresettable circuit breaker that is designed to open only once and then to stay open thereafter. Such one-shot circuit breakers can be built to be relatively inexpensive because they do not require an intricate firing and reset mechanism. In its simplest form, each contact of the secondary circuit breaker 66 may be built as two spring contacts that want to come apart but that are held together by a fusible element. When the fusible element is blown, it releases the contacts and the contacts separate, thereby breaking the current flow.

Figure 3:
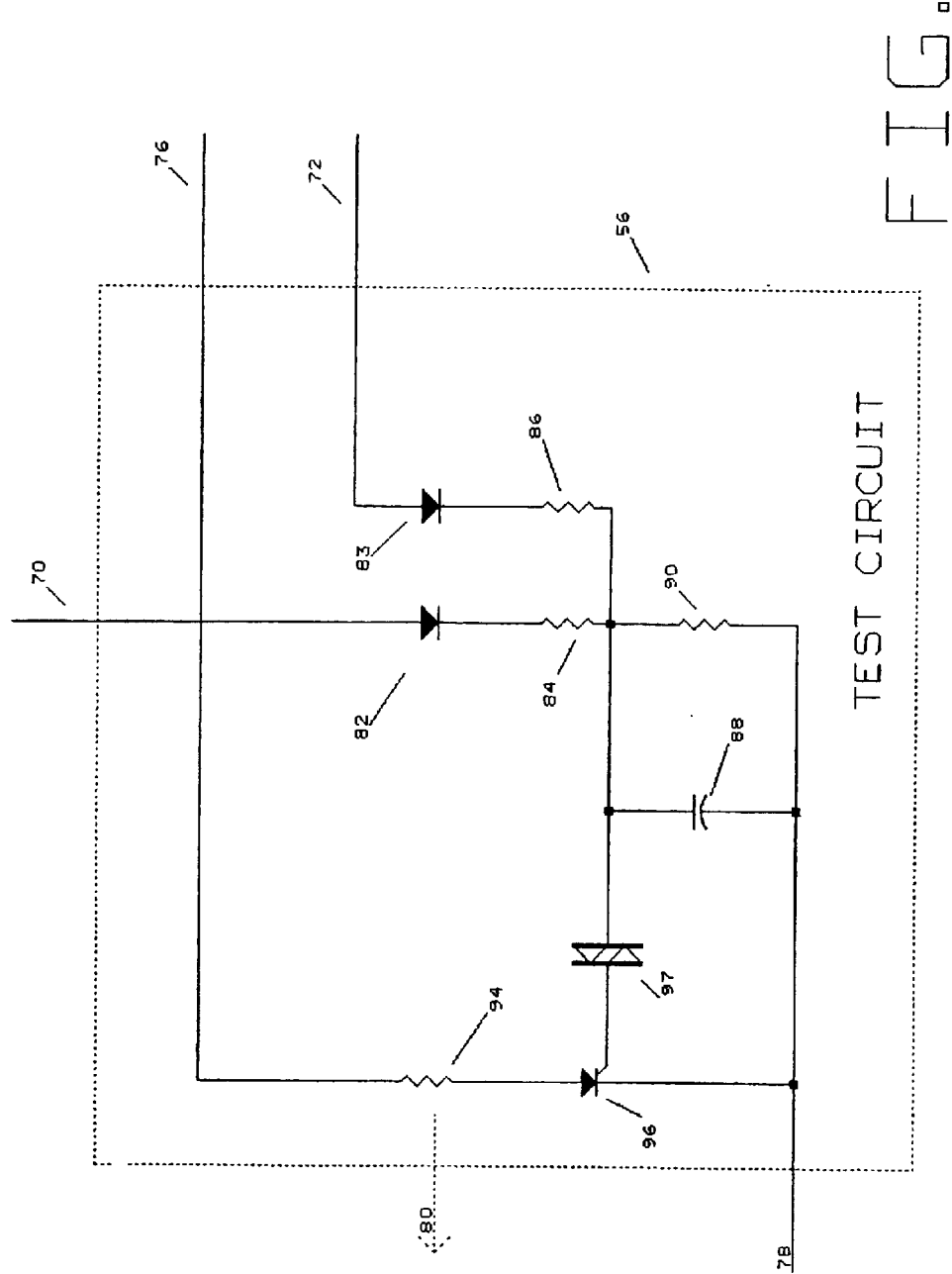
FIG. 3—One specific embodiment of the test circuit

FIG. 3 depicts a preferred embodiment of the test circuit 56 of FIG. 2. There are 2 inputs, either of which can activate the test circuit. Signal 72 is nonzero whenever the test button 50 in FIG. 2 is pressed and the load (34 in FIG. 2) is receiving power. Signal 70 is nonzero whenever the detection electronics in FIG. 2 detects a fault and tries to fire the thyristor 42. If either signal 70 or signal 72 develops a positive potential then it charges capacitor 88 through the series combination of resistor 84 and diode 82, and/or the series combination of resistor 86 and diode 83. Diodes 82 and 83 serve a dual role of rectification and steering. Resistors 84 and 86 are sized so as to give equivalent capacitor 88 charging rate regardless of the source (70 or 72). When either of the optocouplers 82 are fired, this causes a capacitor 88 to be charged through one or both of charging resistors 92. When the capacitor 88 is sufficiently charged, it fires the transistor 96, causing the oneshot resistor 94 to disintegrate, thereby causing the secondary circuit breaker contacts (66 in FIG. 2) to open. Discharge resistor 90 serves to discharge the capacitor 88 when no fault or manual test is in progress. Accordingly, discharge resistor 90 would be chosen to have a relatively high resistance value with respect to charging resistors 84 and 86. Bilateral trigger diode 97 serves to maintain a standoff voltage that must be overcome before firing transistor 96. This gives a level of noise immunity to the circuit, preventing nuisance tripping.

Charging resistors 92, capacitor 88 and discharge resistor 90 are sized so that the oneshot thyristor 96 will be fired after a delay time that is in excess of a reasonable opening time for the primary circuit breaker. For example, Underwriters Laboratories, in its 943 standard, mandates that all Class A GFCI's will open within 25 milliseconds of the application of a fault. So, a reasonable delay time might be 50 milliseconds. That is, the size of the capacitor 88 is chosen so that it charges up to a sufficiently high voltage to trip the oneshot thyristor 96 in a time that is 50 milliseconds after it begins to receive charge in response to a press of the test button, or in response to a sensed fault from the detection electronics (30 in FIG. 2).

If the GFCI is functioning correctly, the oneshot thyristor 96 will never be energized. This is because the circuit breaker contacts 32 and 33 should open within 25 milliseconds after a fault is sensed, thereby removing the effect of the fault and also removing power from the test button 50. Since the fault will be removed (either a real fault like 38 or 40 in FIG. 1 or a simulated fault such as imposed via the test button 50), the detection electronics will no longer be sensing a fault and there will be no power available from the output 80 from the detection electronics 30. If, however, circuit breaker contact 32 does not open, then capacitor 88 will charge high enough to trip oneshot thyristor 96 and power will be removed from the entire circuit by the opening of secondary circuit breaker contacts 66.

Although the above discussion assumed a oneshot resistor, the element that releases the circuit breaker could be a fusible wire. Although the above discussion centered upon a oneshot breaker, it is easily seen that a solenoidal circuit breaker or other style of circuit breaker could be used for the secondary breaker in an identical configuration to the solenoid 36 driven primary breaker of FIG. 1, and, in fact, this secondary breaker could be resettable.

Figure 4:
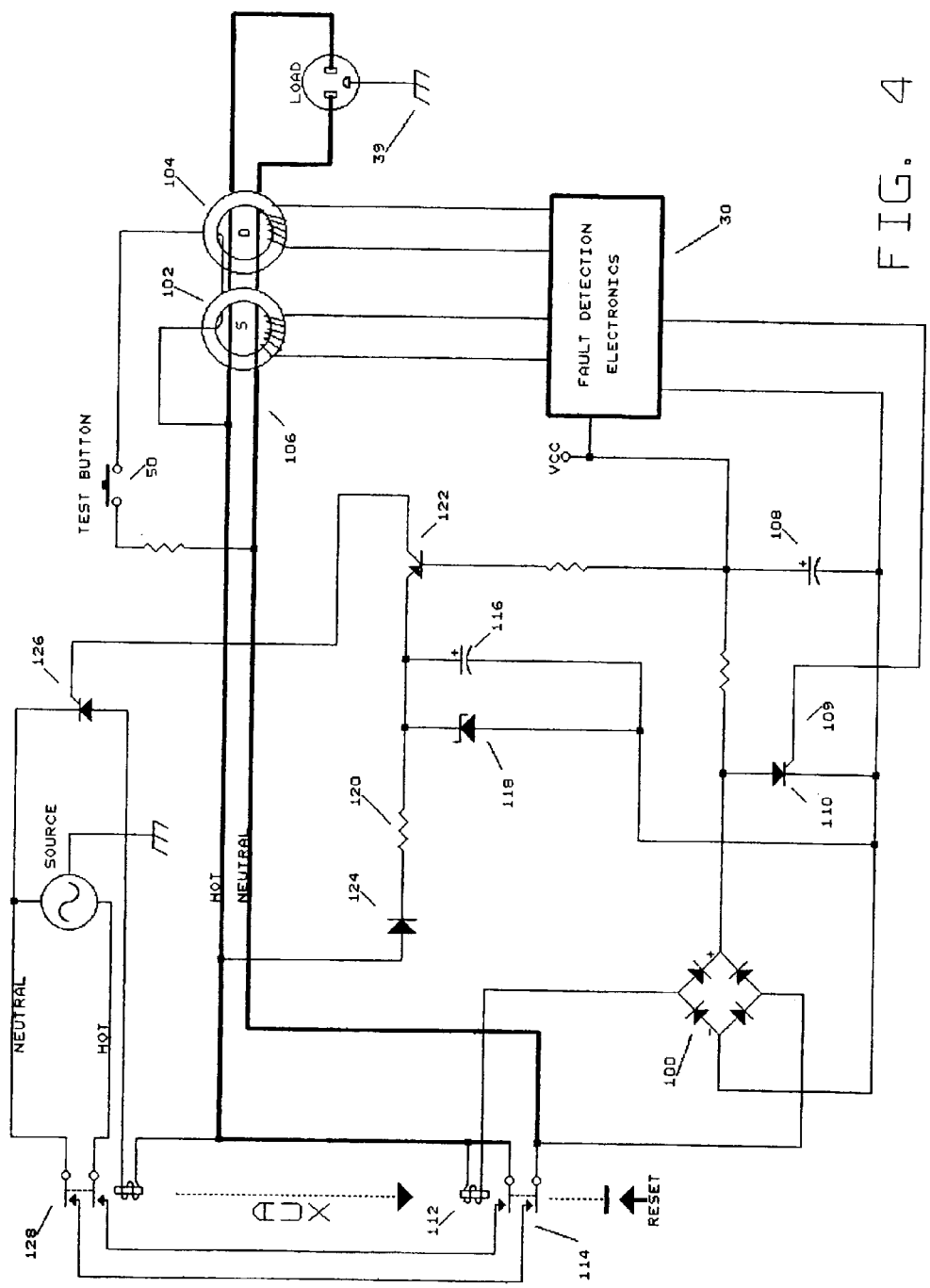
FIG. 4—GFCI modified to automatically detect certain types of failures

FIG. 4 depicts an embodiment of the present invention wherein certain critical components in the fault detection/interruption circuit are continuously monitored for a failure. When a failure is detected, a secondary circuit breaker is triggered, thereby assuring fail safe operation. In FIG. 4, diode bridge 100 performs full wave rectification to generate a D.C. power supply for the fault detection electronics 30. The fault detection electronics 30 sense the output of two differential current transformers 102 and 104. Transformer 102 is used to detect a relatively high resistance leakage path to ground, while transformer 104 is used to detect a relatively low resistance connection between the grounded (neutral) conductor 106 and ground 39. During normal operation, power supply capacitor 108 holds a constant voltage Vcc. When the fault detection electronics fires the gate 109 of thyristor 110, thyristor 110 draws current through diode bridge 100 to fire solenoid 112, thereby causing primary circuit breaker contacts 114 to open. A variety of failure modes in the circuit of FIG. 4 can be detected by monitoring the voltage of the power supply capacitor 108. For example, if the wires in solenoid 112 are open circuited, or if thyristor 110 fails in a shorted condition, or if capacitor 108 acquires an internal short, then capacitor 108 will acquire a voltage substantially less than the design voltage of Vcc. When this happens, it can cause a failure in the fault detection electronics that would go unnoticed until (possibly) a manual test was performed at some later date. However, with the low voltage detection circuit provided by resistor 120, transistor 122, capacitor 116, zener diode 118 and diode 124, a secondary thyristor 126 can be triggered, causing a secondary circuit breaker 128 to open.

Capacitor 116 is charged by the series combination of diode 124 and resistor 120. The charge level is limited by zener diode 118 to a value of something less than the desired charge value (Vcc) of capacitor 108. If, for some reason, the value of voltage across capacitor 108 falls to something less than the breakover voltage of zener diode 118, then transistor 122 will be turned on, and this, in turn, will cause the firing of thyristor 126 and the opening of the secondary circuit breaker 128. Accordingly, the embodiment in FIG. 4 provides a level of protection against a failure of the most problematic components in most GFCI circuits. When combined with the test circuit of FIG. 3, this yields a high degree of redundant protection.

FIG. 5 depicts one embodiment for a redundant circuit breaker release mechanism. The reset button 130 is rigidly connected to an arm 142 that serves to pull moveable member 144 in a direction so that electrical contacts 140 make electrical connection with leaf spring connectors 138, thereby closing both sides of a circuit breaker switch. Spring 132 pushes against fixed plate 134 (shown in cut-away) to exert a force on the arm 142 to cause it to pull upward in FIG. 5. Solenoid 148 is in a fixed position relative to the fixed plate 134. A spring 146 is attached to solenoid housing 148 on one side and is attached to the collar 152 on the other side. In normal operation, the spring 146 serves to exert a pressure against collar 152, causing the arm 142 to remain latched beneath moveable member 144. A plunger 150 within the solenoid housing 148 can move freely within the solenoid housing 148 but is attached on one end to the collar 152. When the solenoid 148 is energized, it pulls on the plunger 150, causing the arm to become unlatched and allowing the contacts 140 to separate from 138, thereby opening the switch. This action describes the latch and release mechanism for the majority of existing fault interrupters.

In FIG. 5, a second release mechanism is depicted by the fusible element 136. This could be, for example, a carbon composition resistor. This fusible element 136 acts as a part of the rigid linkage between the reset button 130 and the arm 142. If a high electrical current is applied to fusible element 136, it will break apart. If the fusible element 136 is caused to break apart, it no longer can provide the linkage between the reset button 130 and the arm 142, in which case, the arm 142 will no longer provide a latching force holding the circuit breaker contacts 140 and 138 together. Accordingly, fusible element 136 represents a one-shot breaker means to opening the circuit breaker contacts and this means is independent of the primary means which employs the solenoid 148. Even though the fusible element 136 does not control a second independent circuit breaker, it represents a second, independent means to release a primary circuit breaker.

Although the invention has been described in detail with particular reference to these preferred embodiments, other embodiments can achieve the same results. While discussion has been directed to providing robustness in a ground fault current interrupt device, the invention can be applied equally well to arc fault current interrupt devices or other types of electrical safety devices. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A fail safe fault interrupt apparatus situated between an electrical source and an electrical load and comprising:

a fault sensing component that detects an electrically unsafe operating condition and generates a fault detection signal in response thereto;

a primary electrical current interrupting component disposed between said electrical source and said electrical load that is activated to interrupt power delivery to said electrical load in response to said fault detection signal; and a test circuit component that automatically monitors the output of said fault sensing component and upon the occurrence of a fault detection signal, delays for a specified time interval and then generates a trigger signal.

2. The apparatus of claim 1 having a secondary electrical current interrupting component disposed between the electrical source and the electrical load that is activated by said trigger signal using power obtained from the load side of said primary electrical current interrupting component.

3. The apparatus of claim 2 wherein said secondary electrical current interrupting component cannot be activated when said primary electrical current interrupting component is preventing power delivery to said electrical load.

4. The apparatus of claim 3 wherein said fault sensing component detects a ground fault.

5. The apparatus of claim 3 having a manual test function whereby a test fault may be simulated by imposing an electrical leakage path around a current sense transformer.

6. The apparatus of claim 5 wherein said test circuit component is also responsive to the occurrence of a manual test and, after a time delay, generates a trigger signal in response thereto.

7. The apparatus of claim 1 wherein said primary electrical current interrupting component is a solenoidal circuit breaker.

8. The apparatus of claim 2 wherein said secondary electrical current interrupting component is a solenoidal circuit breaker.

9. The apparatus of claim 2 wherein said secondary electrical current interrupting component is a one-shot circuit breaker which is normally closed and, when triggered, goes into a permanently open state.

10. The apparatus of claim 1 wherein said time delay is implemented by charging a capacitor through a resistor, and, upon reaching a sufficiently high voltage, generating said trigger signal.

11. A self testing fault interrupt apparatus disposed between an electrical source and an electrical load comprising:

a fault sensing component that detects an electrically unsafe operating condition and generates a fault detection signal in response thereto;

a primary electrical current interrupting component that is triggered to interrupt power delivery to said electrical load in response to said fault detection signal;

a secondary electrical current interrupting component that can be triggered to interrupt power delivery to said electrical load;

a manual test function whereby a test fault may be simulated by imposing an electrical leakage path around a current sense tranformer; and a test circuit that automatically monitors the state of said test fault and upon its application, delays for a specified time interval, and, at the end of which time, if said test fault is still present, triggers said secondary electrical current interrupting component, thereby ensuring the interruption of power delivery to said electrical load.

12. The apparatus of claim 11 wherein said fault sensing component detects a ground fault.

13. The apparatus of claim 11 wherein said primary electrical current interupting component comprises a member from the group consisting of solenoidal relays, bimetallic thermal circuit breakers, thermal magnetic circuit breakers, or circuit breakers employing a fusible link.

14. The apparatus of claim 11 wherein said secondary electrical current interrupting component comprises a member from the group consisting of solenoidal relays, bimetallic thermal circuit breakers, thermal magnetic circuit breakers, or circuit breakers employing a fusible link.

15. The apparatus of claim 11 wherein said secondary electrical current interrupting component is a one-shot circuit breaker which is normally closed and, when triggered, goes into a permanently open state.

16. A fail-safe fault interrupt method comprising the steps of:

a) detecting an electrically unsafe operating condition via a fault sensing component;

b) preventing power delivery upon the detection of an electrically unsafe operating condition via a primary electrical current interrupting component; and c) monitoring the output of said fault sensing component, and, after a time delay, if said fault sensing component continues to sense a fault, responding by interrupting power delivery via a secondary electrical current interrupting component.

* * * * *